United States Patent
Won et al.

(10) Patent No.: US 11,249,550 B2
(45) Date of Patent: Feb. 15, 2022

(54) HAPTIC INTERACTION-BASED VIRTUAL REALITY SIMULATOR AND OPERATION METHOD THEREFOR

(71) Applicant: NAVIWORKS CO., LTD., Anyang-si (KR)

(72) Inventors: Jun Hee Won, Seoul (KR); Jae Uk An, Yongin-si (KR)

(73) Assignee: NAVIWORKS CO., LTD., Anyang-si (KR)

( * ) Notice: Subject to any disclaimer, the term of this patent is extended or adjusted under 35 U.S.C. 154(b) by 0 days.

(21) Appl. No.: 16/617,931

(22) PCT Filed: Dec. 8, 2017

(86) PCT No.: PCT/KR2017/014360
§ 371 (c)(1),
(2) Date: Nov. 27, 2019

(87) PCT Pub. No.: WO2018/221808
PCT Pub. Date: Dec. 6, 2018

(65) Prior Publication Data
US 2021/0141455 A1 May 13, 2021

(30) Foreign Application Priority Data
May 31, 2017 (KR) .................. 10-2017-0067760

(51) Int. Cl.
*G06F 3/01* (2006.01)
*G06F 3/0346* (2013.01)
*G09B 9/00* (2006.01)

(52) U.S. Cl.
CPC .............. *G06F 3/016* (2013.01); *G06F 3/014* (2013.01); *G06F 3/0346* (2013.01); *G09B 9/003* (2013.01)

(58) Field of Classification Search
CPC .......... G05B 2219/40553; G06F 3/016; G06F 3/04886; B60W 50/16; F15B 13/14; H01H 13/85
See application file for complete search history.

(56) References Cited

U.S. PATENT DOCUMENTS 10,241,587 B2 * 3/2019 Fullam .................. G06F 1/3215
10,296,085 B2 * 5/2019 Hamm .................... G06F 3/013
(Continued)

FOREIGN PATENT DOCUMENTS

KR 10-2012-0133347 A 12/2012
KR 10-2013-0101367 A 9/2013
(Continued)

OTHER PUBLICATIONS

International Search Report dated Feb. 20, 2018, in connection with counterpart International Patent Application No. PCT/KR2017/014360, citing the above references.

*Primary Examiner* — William Lu
(74) *Attorney, Agent, or Firm* — Hauptman Ham, LLP

(57) ABSTRACT

The present disclosure proposes a haptic interaction-based virtual reality simulator and a method for operating the same, wherein a virtual tactical training environment is implemented through a virtual display device (for example, HMD), and a haptic stimulus is delivered on the basis of the position, direction, and shape of a virtual hand displayed while being synchronized with a haptic interaction glove worn by a tactical trainee inside the virtual tactical training environment, thereby improving the effect of the tactical training.

10 Claims, 8 Drawing Sheets

| $D_1$ | $D_2$ | $D_3$ | $D_4$ | $D_5$ | Virtual hand shape |
|---|---|---|---|---|---|
| 100mm | 140mm | 140mm | 130mm | 120mm | |
| 20mm | 140mm | 5mm | 7mm | 20mm | |
| 100mm | 140mm | 5mm | 7mm | 20mm | |
| 50mm | 70mm | 70mm | 65mm | 60mm | |
| 20mm | 30mm | 5mm | 7mm | 20mm | |

(56) References Cited

U.S. PATENT DOCUMENTS

| | | | |
|---|---|---|---|
| 10,551,916 B2* | 2/2020 | Chen | G06F 3/014 |
| 10,642,356 B1* | 5/2020 | Wang | G06F 3/03547 |
| 10,831,272 B1* | 11/2020 | Keller | G06F 3/014 |
| 10,852,827 B1* | 12/2020 | Bochereau | G06F 3/014 |
| 10,869,632 B2* | 12/2020 | Di Pardo | A61B 5/225 |
| 2012/0223907 A1* | 9/2012 | Ryu | G06T 19/00 |
| | | | 345/173 |
| 2015/0301592 A1* | 10/2015 | Miller | G06F 3/012 |
| | | | 345/156 |
| 2016/0059412 A1* | 3/2016 | Oleynik | B62D 57/032 |
| | | | 700/257 |
| 2016/0246370 A1* | 8/2016 | Osman | G06T 19/006 |
| 2016/0274662 A1* | 9/2016 | Rimon | G06F 3/016 |
| 2016/0342207 A1* | 11/2016 | Beran | G06F 3/0304 |
| 2016/0363997 A1* | 12/2016 | Black | G06F 3/016 |
| 2017/0168576 A1* | 6/2017 | Keller | G06F 3/016 |
| 2017/0348854 A1* | 12/2017 | Oleynik | A47J 47/02 |
| 2019/0391647 A1* | 12/2019 | Rihn | G06F 3/016 |

FOREIGN PATENT DOCUMENTS

| | | | |
|---|---|---|---|
| KR | 10-2014-0010616 A | 1/2014 | |
| KR | 10-2016-0039589 A | 4/2016 | |

* cited by examiner

| $D_1$ | $D_2$ | $D_3$ | $D_4$ | $D_5$ | Virtual hand shape |
|---|---|---|---|---|---|
| 100mm | 140mm | 140mm | 130mm | 120mm |  |
| 20mm | 140mm | 5mm | 7mm | 20mm |  |
| 100mm | 140mm | 5mm | 7mm | 20mm |  |
| 50mm | 70mm | 70mm | 65mm | 60mm |  |
| 20mm | 30mm | 5mm | 7mm | 20mm |  |

HAPTIC INTERACTION-BASED VIRTUAL REALITY SIMULATOR AND OPERATION METHOD THEREFOR

BACKGROUND OF THE INVENTION

1. Field of the Invention

The present disclosure relates to a scheme for delivering a more realistic haptic stimulus to a haptic interaction glove worn by a tactical trainee on the basis of the position, direction, and shape of a virtual hand displayed ile being synchronized with the haptic interaction glove inside a virtual tactical training environment implemented through a virtual display device (for example, HMD).

2. Description of the Prior Art

In line with the recent rapid development of computer-related technologies, research on three-dimensional visualization of a tactical situation recognition, which delivers a battlefield situation quickly and accurately so as to support operation execution and command/control, has become a major research subject. This also has made it possible to three-dimensionally display all wartime objects, such as geographic information and tactical information, inside a tactical situation map.

Such a trend has recently been followed by development of tactical training platforms including tactical training simulator equipment. Such platform have been utilized for the purpose of familiarizing tactical trainees with equipment, before handling actual equipment, and improving ability thereof to handle respective situations through a simulated environment in which tactical situations are displayed three-dimensionally, and actual equipment used in tactical situations are simulated.

However, in the case of existing tactical training platforms, which attempt to implement simulated environments that simulate actual equipment through simulator equipment, discrepancies normally exist between the same and actual tactical equipment. In addition, during the training processes, the tactical trainees are provided with visual and sensory user interfaces (UIs) that provide insufficient realistic experiences. As such, there is a doubt about the effect of tactical trainings that could be accomplished through existing tactical training platforms.

SUMMARY OF THE INVENTION

The present disclosure has been made in order to solve the above-mentioned problems in the prior art, and an aspect of the present disclosure is to implement a virtual tactical training environment through a virtual display device (for example, HMD) and to deliver a more realistic haptic stimulus to a haptic interaction glove worn by a tactical trainee on the basis of the position, direction, and shape of a virtual hand displayed while being synchronized with the haptic interaction glove inside the virtual tactical training environment, thereby improving the effect of the tactical training.

In accordance with an aspect of the present disclosure, a virtual reality simulator includes: a determination unit configured to determine the position, direction, and shape of a virtual hand displayed wile being synchronized with a haptic interaction glove worn by a tactical trainee inside a virtual tactical training environment implemented through a virtual display device on the basis of sensing information received from the haptic interaction glove; a confirmation unit configured to confirm whether or not contact occurs between the virtual hand and a virtual object positioned inside the virtual tactical training environment on the basis of the position, direction, and shape of the virtual hand inside the virtual tactical training environment; and a designation unit configured to designate a haptic stimulus application region, to which a haptic stimulus is to be applied on the haptic interaction glove, on the basis of a state of contact between the virtual hand and the virtual object when it is confirmed that contact occurs between the virtual hand and the virtual object.

More specifically, the sensing information includes at least one selected from an acceleration sensing value sensed from a reference sensor positioned in a palm center region of the haptic interaction glove, a gyroscope sensing value, and distance sensing values from the reference sensor to respective finger end regions of the haptic interaction glove.

More specifically, the determination unit is configured to determine the position and the direction of the virtual hand n the basis of at least one selected from movement values in three axes in forward/backward, upward/downward, and leftward/rightward directions in a three-dimensional space, which are confirmed from the acceleration sensing value, and three-axes rotation values of pitch, roll, and yaw confirmed from the gyroscope sensing value.

More specifically, the determine unit is configured to determine the shape of the virtual hand on the basis of distances from the reference sensor to respective finger end regions of the haptic interaction glove, which are confirmed from the distance sensing values.

More specifically, the determination unit is configured to determine the shape of the virtual hand with reference to a mapping table enumerating mapping relations between combinations of distances from the reference sensor to respective finger end regions of the haptic interaction glove and multiple hand shape images that the tactical trainee can form by moving finger parts.

More specifically, the haptic stimulus application region is designated such that at least one of a center point, to which a haptic stimulus is applied in the haptic stimulus application region, and the area of the haptic stimulus application region, which is calculated with reference to the center point, is different according to the state of contact determined according to the position, direction, and shape of the virtual hand.

In accordance with an aspect of the present disclosure, a method for operating a virtual reality simulator includes the steps of determining the position, the direction, and the shape of a virtual hand displayed while being synchronized with a haptic interaction glove worn by a tactical trainee inside a virtual tactical training environment implemented through a virtual display device on the basis of sensing information received from the haptic interaction glove; confirming whether or not contact occurs between the virtual hand and a virtual object positioned inside the virtual tactical training environment on the basis of the position, direction, and shape of the virtual hand inside the virtual tactical training environment; and designating a haptic stimulus application region, to which a haptic stimulus is to be applied on the haptic interaction glove, on the basis of a state of contact between the virtual hand and the virtual object when it is confirmed that contact occurs between the virtual hand and the virtual object.

More specifically, the sensing information includes at least one selected from an acceleration sensing value sensed from a reference sensor positioned in a palm center region of the haptic interaction glove, a gyroscope sensing value, and distance sensing values from the reference sensor to respective finger end regions of the haptic interaction glove.

More specifically, in the determining step, the position and the direction of the virtual hand are determined on the basis of at least one selected from movement values in three axes in forward/backward, upward/downward, and leftward/rightward directions in a three-dimensional space, which are confirmed from the acceleration sensing value, and three-axes rotation values of pitch, roll, and yaw confirmed from the gyroscope sensing value.

More specifically, in the determining step, the shape of the virtual hand is determined on the basis of distances from the reference sensor to respective finger end regions of the haptic interaction glove, which are confirmed from the distance sensing values.

More specifically, in the determining step, the shape of the virtual hand is determined with reference to a mapping table enumerating mapping relations between combinations of distances from the reference sensor to respective finger end regions of the haptic interaction glove and multiple hand shape images that the tactical trainee can form by 1o moving finger parts.

More specifically, the haptic stimulus application region is designated such that at least one of a center point, to which a haptic stimulus is applied in the haptic stimulus application region, and the area of the haptic stimulus application region, which is calculated with reference to the center point, is different according to the state of contact determined according to the position, direction, and shape of the virtual hand.

The haptic interaction-based virtual reality simulator and the method for operating the same, according to the present disclosure, implement a virtual tactical training environment through a virtual display device (for example, HMD), and deliver a more realistic haptic stimulus in view of the position, direction, and shape of a virtual hand displayed while being synchronized with a haptic interaction glove worn by a tactical trainee inside the virtual tactical training environment, thereby improving the effect of the tactical training.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
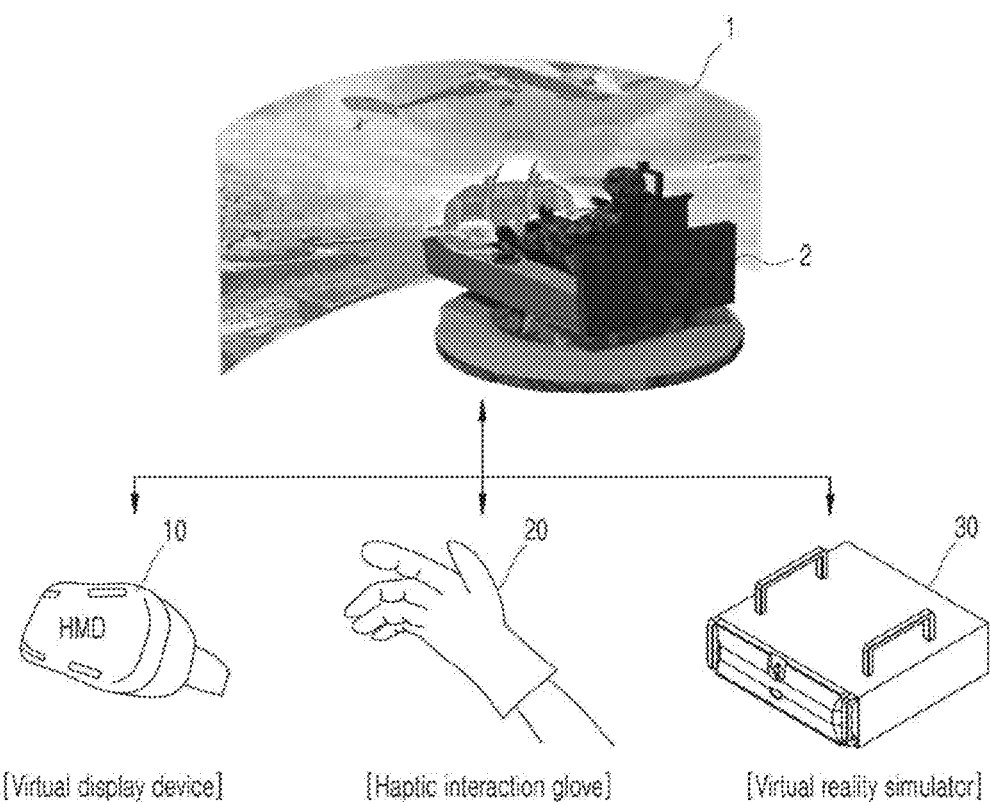
FIG. 1 is a diagram illustrating an exemplary virtual tactical training system according to an embodiment of the present disclosure.

It should be noted that the technical term as used herein are merely used for describing particular embodiments, and are not intended to limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

In addition, a singular expression used in the specification includes a plural expression as long as they are clearly distinguished in the context. In the present disclosure, the term "comprise" or "include" should not be construed as necessarily including all of various elements or various steps disclosed herein, and it should be understood that some of the elements or steps may not be included or additional elements or steps may be further included.

In addition, although terms including ordinal numbers such as first, second, and the like may be used to describe various elements, the elements should not be restricted by the terms. The term are used merely for the purpose to distinguish an element from the other elements. For example, a first element may be termed a second element, and similarly, a second element may be termed a first element without departing from the scope of the present disclosure.

Hereinafter, embodiments of the present disclosure will be described in detail with reference to the accompanying drawings, equal or similar elements are assigned an equal reference numeral, and an overlapping description thereof will be omitted.

Further, in the following description of the technology of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the technical idea should not be construed as being limited by the accompanying drawings.

Hereinafter, an embodiment of the present disclosure will be described with reference to the accompanying drawings.

FIG. 1 illustrates a virtual tactical training system according to an embodiment of the present disclosure.

As illustrated in FIG. 1, the virtual tactical training system according to an embodiment of the present disclosure may be configured to include a virtual display device 10, a haptic interaction glove 20, and a virtual reality simulator 30.

The virtual display device 10 refers to a device configured to visually provide a 3D-based virtual tactical training environment to a tactical trainee wearing the same, and a head mounted display (HMD), for example, may correspond thereto.

The haptic interaction glove 20 refers to a haptic device worn by the tactical trainee on his/her hand and may deliver a haptic stimulus according to contact occurring between a virtual object and a virtual hand of the tactical trainee, which is displayed while being synchronized with the haptic interaction glove 20 inside the virtual tactical training environment 1.

For reference, the type of delivery of a haptic stimulus by the haptic interaction glove 20 may include, for example, a magnetic type in which an electromagnet is used to implement a drawing or repelling force, an actuator-based pressurizing type, and the like. However, these examples are not limiting in any manner, and tactile sensations may be implemented inside the haptic interaction glove 20 in any known types.

The virtual reality simulator 30 refers to a device configured to provide a virtual tactical training environment while interworking with the virtual display device 10 and the haptic interaction glove 20 described above, and may be mounted inside a cockpit platform 2 or implemented as a separate server.

Figure 2:
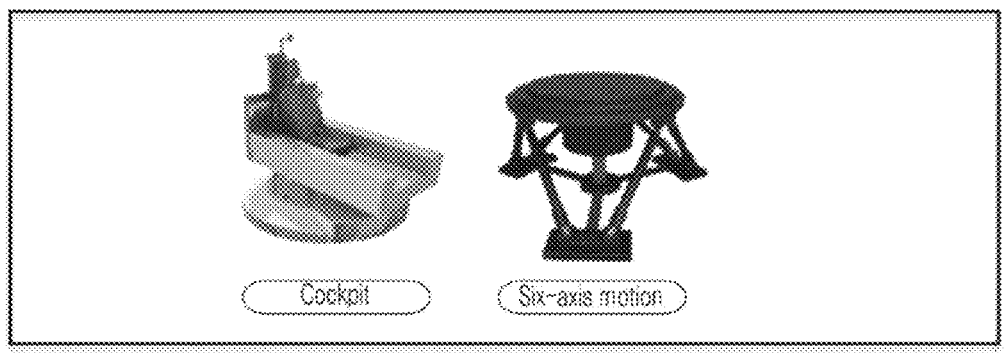
FIG. 2 is a diagram illustrating an exemplary cockpit platform according to an embodiment of the present disclosure.
Figure 2:
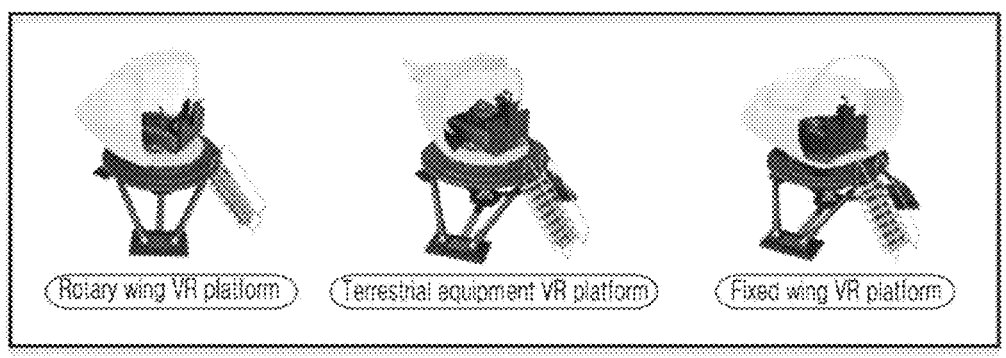

A tactical trainee may mount the cockpit platform 2 according to an embodiment of the present disclosure as illustrated in FIG. 2, for example. The cockpit platform 2 may include a cockpit that can be varied depending to the tactical equipment, such as a rotary wing (for example, UH-60), a fixed wing (for example, F-16), or terrestrial equipment (for example, K-1A1), and a six-axis motion configured to implement a six-degree-of-freedom movement with regard to the cockpit such that movements of tactical equipment such as the rotary wing, the fixed wing, or the terrestrial equipment can be made only by the single cockpit.

The virtual tactical training system according to an embodiment of the present disclosure, described above, implements a virtual tactical training environment 1 through the virtual display device 10, and delivers a haptic stimulus to the tactical trainee's hand by tracking the tactical trainee' virtual hand displayed while being synchronized with the haptic interaction glove 20 inside the virtual tactical training environment 1.

In order to track the tactical trainee's virtual hand inside the virtual tactical training environment 1 in this manner, it is necessary to track the movement of the haptic interaction glove 20 which is synchronized with the virtual hand. In this regard, there have been proposed technologies for tracking the position and direction, and technologies for tracking the shape of the hand by measuring the angle of fingers.

However, such existing technologies require that a large number of sensors be attached to respective parts of the hand area, including finger joints, and also have restrictions related to the cost and time in that it takes a long time to determine the position, direction, and shape of the hand by interpreting sensing information received from respective sensors.

Accordingly, the present disclosure seeks to provide a scheme for minimizing the number of sensors attached to the haptic interaction glove 20 and intuitively determining the position, direction, and shape of the tactical trainee's hand by using sensing information received from the minimum number of sensors, and a scheme for delivering a more realistic haptic stimulus accordingly. The configuration of the virtual reality simulator 30, to this end, will now be described in more detail.

Figure 3:
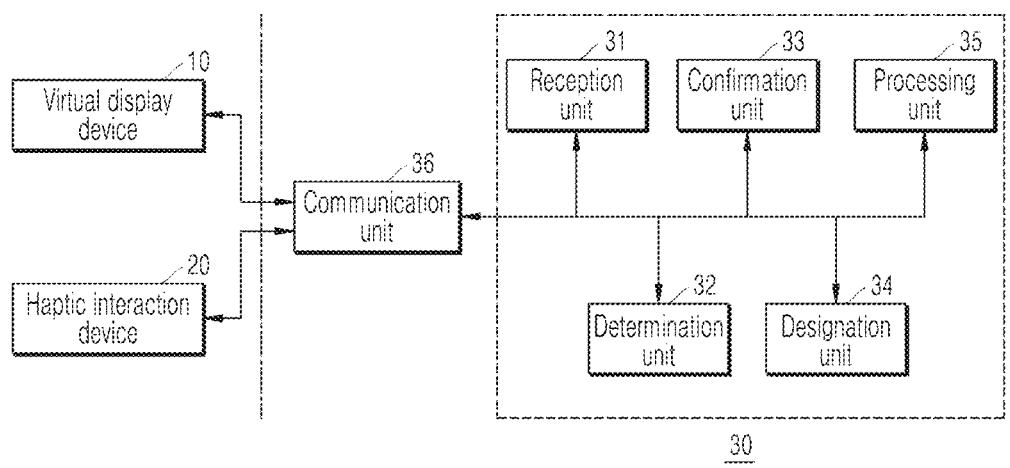
FIG. 3 is a diagram illustrating the configuration of a virtual reality simulator according to an embodiment of the present disclosure.

FIG. 3 illustrates a schematic configuration of a virtual reality simulator 30 according to an embodiment of the present disclosure.

As illustrated in FIG. 3, the virtual reality simulator 30 according to an embodiment of the present disclosure may be configured to include a reception unit 31, a determination unit 32, a confirmation unit 33, a designation unit 34, and a processing unit 35.

All or part of the configuration of the virtual reality simulator 30 including the reception unit 31, the determination unit 32, the confirmation unit 33, the designation unit 34, and the processing unit 35 may be implemented as a hardware module, as a software module, or as a combination of a hardware module and a software module.

As used herein a software module may be understood as an instruction executed by a processor configured to control operations inside the virtual reality simulator 30, for example, and such an instruction may be mounted in a memory inside the virtual reality simulator 30.

The virtual reality simulator 30 according to an embodiment of the present disclosure may further include a communication unit 36 in addition to the above-mentioned constituent elements.

The communication unit 36 is configured to provide a function for communicating with the virtual display device 10 and the haptic interaction glove 20. To this end, the communication unit 36 includes, for example, an antenna system, an RF transceiver, at least one amplifier, a tuner, at least one oscillator, a digital signal processor, a codec chipset, and a memory, but is not limited thereto, and may include a known circuit configured to perform this function.

Wireless communication protocols supported by the communication unit 36 may include, for example, WLAN (Wireless LAN), DLNA (Digital Living Network Alliance), Wibro (Wireless Broadband), Wimax (World Interoperability for Microwave Access), GSM (Global System for Mobile Communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access). IEEE 802.16, LTE (Long Term Evolution), LTE-A (Long Term Evolution-Advanced), WMBS (Wireless Mobile Broadband Service). Wi-Fi, and Wi-Fi Direct. In addition, wired communication protocols may include, for example, wired LAN (Local Area Network), wired WAN (Wide Area Network), PLC (Power Line Communication), USB communication, Ethernet, serial communication, and optical/coaxial cables, and may include, without being limited thereto, any protocol capable of providing an environment for communication with another device.

In summary, the virtual reality simulator 30 according to an embodiment of the present disclosure, configured as above, may intuitively determine the position, direction, and shape of the tactical trainee's hand by using the sensing information received from the haptic interaction glove 20, and may deliver a realistic haptic stimulus to the haptic interaction glove 20 according to the result of determination. Each internal constituent element of the virtual reality simulator 30 to this end will now be described in more detail.

The reception unit 31 is configured to receive sensing information from the haptic interaction glove 20.

More specifically, the reception unit 31 is configured to receive, from the haptic interaction glove 20 worn by the tactical trainee, sensing information for determining the position, direction, and shape of a virtual hand displayed while being synchronized with the haptic interaction glove 20 inside the virtual tactical environment 1.

Figure 4:
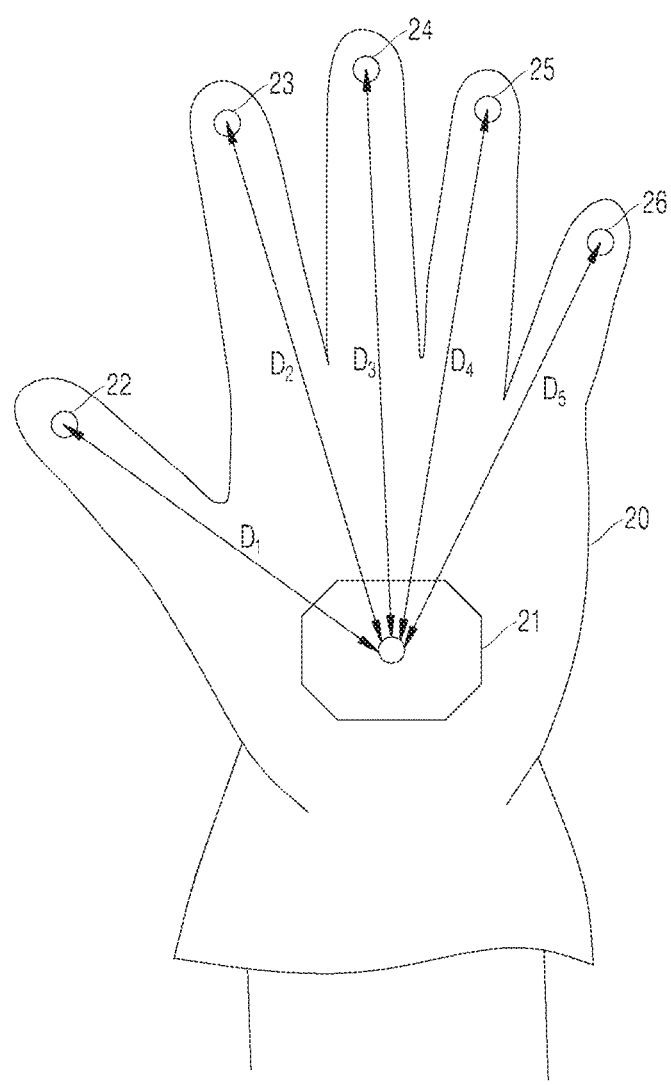
FIG. 4 is a diagram illustrating exemplary sensing information according to an embodiment of the present disclosure.

The sensing information received from the haptic interaction glove 20 includes, as illustrated in FIG. 4 for example, an acceleration sensing value from a reference sensor 21 positioned in the palm center area of the haptic interaction glove, a gyroscope sensing value, and distance sensing values $D_1$, $D_2$, $D_3$, $D_4$, and $D_5$ from the reference sensor 21 to terminal wireless devices 22, 23, 24, 25, and 26 attached to respective finger end areas of the haptic interaction glove 20.

For reference, the reference sensor 21 may be an inertial measurement unit (IMU) sensor.

The terminal wireless devices 22, 23, 24, 25, and 26 attached to respective finger end areas may include all devices capable of transmitting near-field wireless communication signals (for example, Bluetooth or Zigbee).

In relation to the terminal wireless devices 22, 23, 24, 25, and 26, the reference sensor 21 may acquire distance sensing values $D_1$, $D_2$, $D_3$, $D_4$, and $D_5$ to the terminal wireless devices 22, 23, 24, 25, and 26 attached to respective finger end areas by using the received signal strength indicator (RSSI) of near-field wireless communication signals received from respective terminal wireless devices 22, 23, 24, 25, and 26.

That is, distances mapped to the RSSI of near-field wireless communication signals received from respective terminal wireless devices 22, 23, 24, 25, and 26 may be acquired as the distance sensing values $D_1$, $D_2$, $D_3$, $D_4$, and $D_5$ to the terminal wireless devices 22, 23, 24, 25, and 26 attached to respective finger end areas.

The determination unit 32 is configured to determine the position direction and shape of the virtual hand.

More specifically, if sensing information is received from the haptic interaction glove 20, the determination unit 32 determines, from the received sensing information, the position, direction, and shape of the virtual hand displayed wile being synchronized with the haptic interaction glove 20 worn by the tactical trainee in the virtual tactical environment 1.

Figure 5:
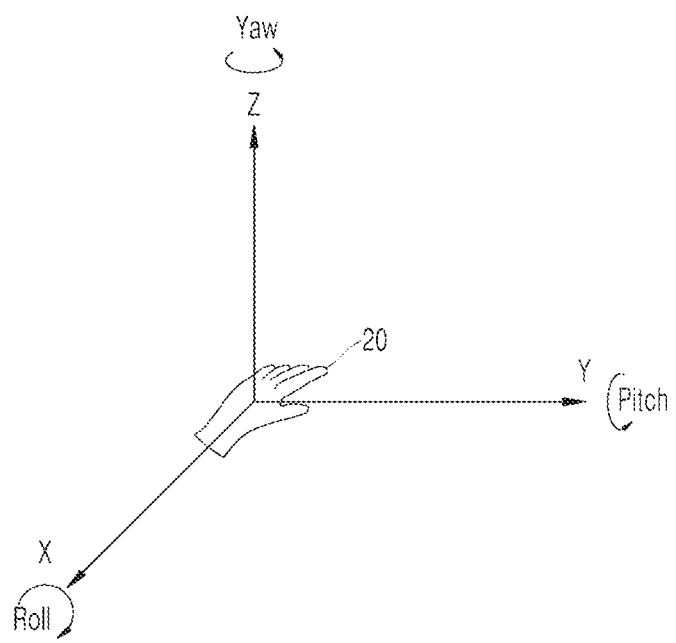
FIG. 5 is a diagram illustrating exemplary determination of the position and direction of a virtual hand according to an embodiment of the present disclosure.

The determination nit 32 may determine the position and direction of the virtual hand inside the virtual training environment 1 as illustrated in FIG. 5, for example, by using movement values along three axes in the forward/backward axis, upward/downward axis, and leftward/rightward directions in a three-dimensional space confirmed from the acceleration sensing value within the sensing information, and three-axial rotation values of pitch, roll, and yaw values confirmed from the gyroscope sensing value within the sensing information.

The determination unit 32 is configured to determine the shape of the virtual hand on the basis of the distance sensing values $D_1$, $D_2$, $D_3$, $D_4$, and $D_5$ within the sensing information.

In other words, the determination unit 32 determines the shape of the virtual hand, which can be formed by movements of fingers of the tactical trainee wearing the haptic interaction glove 20, on the basis of the distance sensing values $D_1$, $D_2$, $D_3$, $D_4$, and $D_5$ within the sensing information.

Figure 6:
FIG. 6 is a diagram illustrating exemplary determination of the shape of a virtual hand according to an embodiment of the present disclosure.
Figure 6:
Figure 6:
Figure 6:
Figure 6:

The determination unit 32 may determine the shape of the virtual hand with reference to a mapping table as illustrated in FIG. 6 for example, which enumerates mapping relations between combinations of distances from the reference sensor 21 to respective finger end areas of the haptic interaction glove and multiple hand shape images that the tactical trainee can form by moving finger parts.

That is, the determination unit 32 may confirm, with reference to the mapping table, a distance combination matching with distance sensing values $D_1$, $D_2$, $D_3$, $D_4$, and $D_5$ within the sensing information, and may determine a virtual hand shape movement mapped to the confirmed distance combination as the shape of the virtual hand.

The statement that there is a match between distance sing values $D_1$, $D_2$, $D_3$, $D_4$, and $D_5$ within the sensing information and a combination of distances in the mapping table may means that the distances to respective finger end regions confirmed from the sensing values $D_1$, $D_2$, $D_3$, $D_4$, and $D_5$ and the distances defined in the mapping table are identical with each other within predetermined error ranges.

The confirmation unit 33 is configured to confirm whether or not contact occurs inside the virtual tactical training environment 1.

More specifically, if the position, direction, and shape of the virtual hand is determined on the basis of the sensing information received from the haptic interaction glove 20, the confirmation unit 33 confirms whether or not contact occurs between the virtual hand and a virtual object positioned inside the virtual tactical training environment 1 on the basis of the determined position, direction, and shape of the virtual hand.

The confirmation regarding whether or not contact occurs between the virtual hand and the virtual object may be made by determining whether or not the position of the virtual object with reference to a positional coordinate system provided inside the virtual tactical training environment 1 is identical to the position of the virtual hand, which is likewise determined by the position, direction, and shape of the virtual hand inside the virtual tactical training environment 1.

As used herein, a virtual object positioned inside the virtual tactical training environment 1 may refer to a manipulation button on a control stick implemented through the virtual tactical training environment 1, for example, and contact between the virtual object and the virtual hand may be understood as referring to a state in which the virtual hand contacts the manipulation button (corresponding to the virtual object) in order to press the same.

The designation nit 34 is configured to designate a haptic stimulus application region.

More specifically, when it is confirmed that contact occurred between the virtual hand and the virtual object positioned inside the virtual tactical training environment 1, the designation nit 34 designates an area to which a haptic stimulus is to be applied on the 1o haptic interaction glove 20 (haptic stimulation application region), on the basis of the state of contact between the virtual hand and the virtual object.

The designation unit 34 may designate the haptic stimulus application region by designating a center point to which a haptic stimulus is applied, and the area to which the haptic stimulus is applied with reference to the center point, according to the state of contact between the virtual hand and the virtual object.

The state of contact between the virtual hand and the virtual object may be determined from the angle formed between the center axis of the virtual hand and the center axis of the virtual object.

Figure 7:
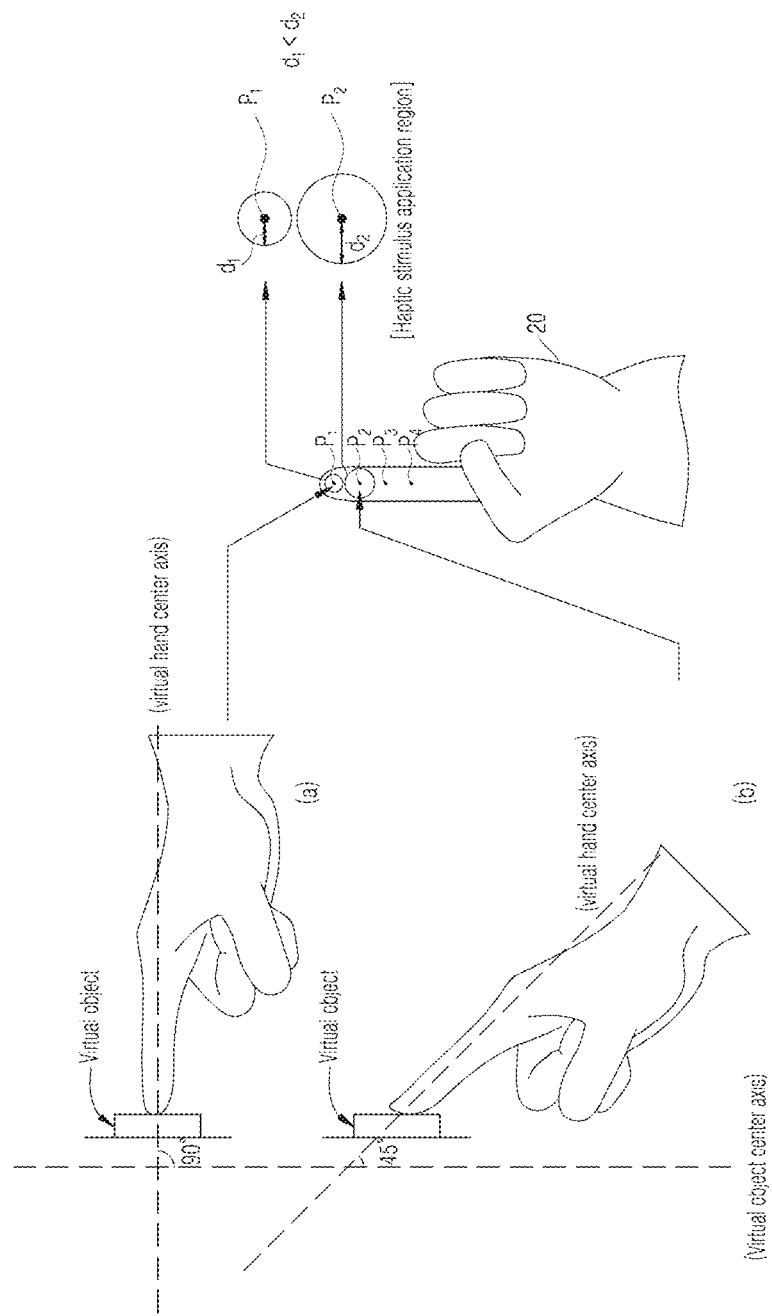
FIG. 7 is a diagram illustrating an exemplary haptic stimulus application region according to an embodiment of the present disclosure.

For example, referring to FIG. 7, it is possible to confirm a first approach state (a) in which a virtual hand with only the forefinger unfolded approaches a virtual object at an approach angle or 90°, and a second approach state (b) in which a virtual hand with only the forefinger unfolded likewise approaches a virtual object at an approach angle or 45°.

In the first approach state (a), $P_1$ may be designated as the center point to which a haptic stimulus is applied, and a haptic stimulus application region, the area of which is calculated by a radius of $d_1$ with reference to $P_1$, may be designated. In the second approach state (b), $P_2$ may be designated as the center point to which a haptic stimulus is applied, a haptic stimulus application region, the area of which is calculated by a radius of $d_2$ ($d_2 > d_1$) with reference to $P_2$ may be designated.

That is, according to an embodiment of the present disclosure, the region to which a haptic stimulus is to be applied (haptic stimulus application region) may be designated so as to reflect the state of contact between the virtual hand and the virtual object, which may vary depending on the position and direction of the virtual hand, even if the shape of the virtual hand is identical.

The processing unit 35 is configured to process a haptic stimulus.

More specifically, when the haptic stimulus application region is designated on the basis of the state of contact between the virtual hand and the virtual object, the processing unit 35 delivers information regarding the haptic stimulus application region (the center point to which a haptic stimulus is applied and the area from the center point) to the haptic interaction glove 20 such that the haptic interaction glove 20 can apply a haptic stimulus to a region corresponding to the haptic stimulus application region according to the contact between the virtual hand and the virtual object.

That is, according to an embodiment of the present disclosure, the center point to which a haptic stimulus is applied in the haptic stimulus application area, and the area of the haptic stimulus application region, which is calculated with reference to the center point, are designated differently depending on the state of contact determined on the basis of the position, direction, and shape of the virtual hand. Accordingly, a more realistic stimulus can be delivered to the tactical trainee.

As described above, according to the virtual reality simulator 30 according to an embodiment of the present disclosure, a virtual tactical training environment is implemented through the virtual display device 10, the position, direction, and shape of the virtual hand displayed while being synchronized with the haptic interaction glove 20 worn by the tactical trainee inside the virtual tactical training environment are tracked, and a realistic haptic stimulus is delivered accordingly, thereby improving the effect of the tactical training.

Figure 8:
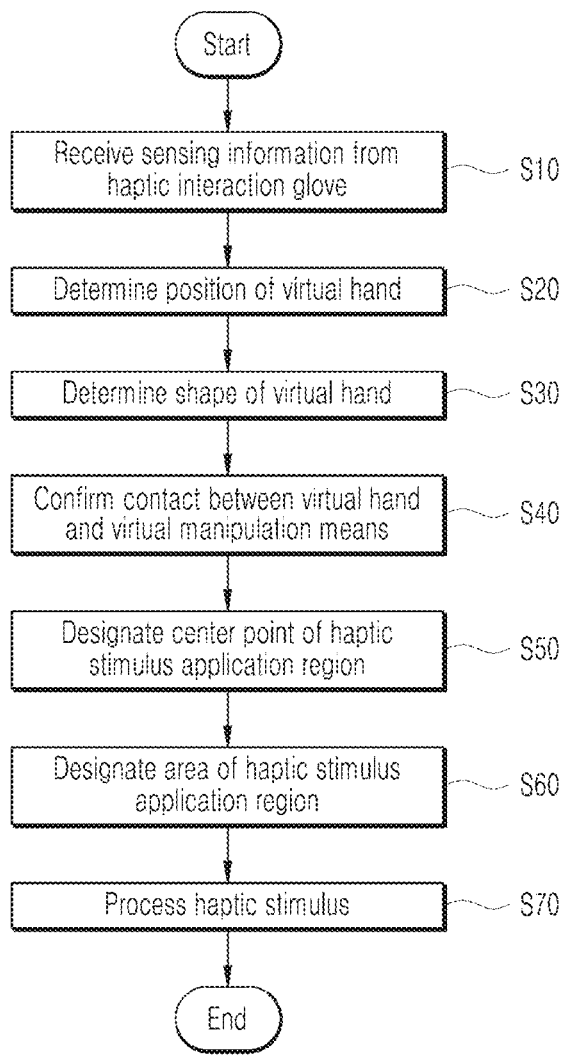
FIG. 8 is a flowchart illustrating an operation flow in a virtual reality simulator according to an embodiment of the present disclosure.

The configuration of the virtual reality simulator 30 according to an embodiment of the present disclosure has been described above. A flow of operations in the virtual reality simulator 30 according to an embodiment of the present disclosure will now be described with reference to FIG. 8.

The reception 31 initially receives sensing information for determining the position, direction, and shape of a virtual hand displayed while being synchronized with the haptic 1o interaction glove 20 worn by the tactical trainee in the virtual tactical environment 1, from the haptic interaction glove 20 in step S10.

The sensing information received from the haptic interaction glove 20 includes, as illustrated in FIG. 4 for example, an acceleration sensing value from a reference sensor 21 positioned in the palm center area of the haptic interaction glove, a gyroscope sensing value, and distance sensing values $D_1$, $D_2$, $D_3$, $D_4$, and $D_5$ from the reference sensor 21 to terminal wireless devices 22, 23, 24, 25, and 26 attached to respective finger end areas of the haptic interaction glove 20.

When the sensing information is received from the haptic interaction glove 20, the determination nit 32 determines the position and direction of the virtual hand displayed while being synchronized with the haptic interaction glove 20 worn by the tactical trainee in the virtual tactical environment 1 from the received sensing information in step S20.

The determination unit 32 may determine the position and direction of the virtual hand inside the virtual training environment 1 as illustrated in FIG. 5, for example, by using movement values along three axes in the forward/backward axis, upward/downward axis, and leftward/rightward directions in a three-dimensional space confirmed from the acceleration sensing value within the sensing information, and three-axial rotation values of pitch, roll, and yaw values confirmed from the gyroscope sensing value within the sensing information.

The determination unit 32 then determines the shape of the virtual hand, which can be formed by movements of fingers of the tactical trainee wearing the haptic interaction glove 20, on the basis of the distance sensing values $D_1$, $D_2$, $D_3$, $D_4$, and $D_5$ within the sensing information in step S30.

The determination unit 32 may determine the shape of the virtual hand with reference to a mapping table as illustrated in FIG. 6 for example, which enumerates 1o mapping relations between combinations of distances from the reference sensor 21 to respective finger end areas of the haptic interaction glove and multiple hand shape images that the tactical trainee can form by moving finger parts.

That is, the determination unit 32 may confirm, with reference to the mapping table, a distance combination matching with distance sensing values $D_1$, $D_2$, $D_3$, $D_4$, and $D_5$ within the sensing information, and may determine a virtual hand shape movement mapped to the confirmed distance combination as the shape of the virtual hand.

When the position, direction, and shape of the virtual hand are determined on the basis of the sensing information received from the haptic interaction glove 20, the confirmation unit 33 confirms whether or not there is contact between the virtual hand and a virtual object positioned inside the virtual tactical training environment 1 on the basis of the position, direction, and shape of the virtual hand in step S40.

The confirmation regarding whether or not contact occurs between the virtual hand and the virtual object may be made by determining whether or not the position of the virtual object with reference to a positional coordinate system provided inside the virtual tactical training environment 1 is identical to the position of the virtual hand, which is likewise determined by the position, direction, and shape of the virtual hand inside the virtual tactical training environment 1.

If it is confirmed that contact occurred between the virtual hand and the virtual object positioned inside the virtual tactical training environment 1, the designation unit 34 designates a region to which a haptic stimulus is to be applied on the haptic interaction glove 20 (haptic stimulus application region), on the basis of the state of contact between the virtual hand and the virtual object in steps S50 and S60.

The designation unit 34 may designate the haptic stimulus application region by designating a center point to which a haptic stimulus is applied, and the area to which the haptic stimulus is applied with reference to the center point, according to the state of contact between the virtual hand and the virtual object.

When the haptic stimulus application region is designated on the basis of the state of contact between the virtual hand and the virtual object, the processing unit 35 delivers information regarding the haptic stimulus application region (the center point to which a haptic stimulus is applied and the area from the center point) to the haptic interaction glove 20 in step S70 such that the haptic interaction glove 20 can apply a haptic stimulus to a region corresponding to the haptic stimulus interaction application region according to the contact between the virtual hand and the virtual object.

That is, according to an embodiment of the present disclosure, the center point to which a haptic stimulus is applied in the haptic stimulus application area, and the area of the haptic stimulus application region, which is calculated with reference to the center point, are designated differently depending on the state of contact determined on the basis of the position, direction, and shape of the virtual hand. Accordingly, a more realistic stimulus can be delivered to the tactical trainee.

As described above, according to a flow of operations in the virtual reality simulator 30 according to an embodiment of the present disclosure, a virtual tactical training environment is implemented through the virtual display device 10 the position, direction, and shape of the virtual hand displayed while being synchronized with the haptic interaction glove 20 worn by the tactical trainee inside the virtual tactical training environment are tracked, and a realistic haptic stimulus is delivered accordingly, thereby improving the effect of the tactical training.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, coves a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a font-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains man specific implementation details, these should not be construed as limitations to the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in 1o some cases be excised from the combination, and the claimed combination ay be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure.

The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A virtual reality simulator comprising:
a determination unit configured to determine the position, direction, and shape of a virtual hand displayed while being synchronized with a haptic interaction glove worn by a tactical trainee inside a virtual tactical training environment implemented through a virtual display device on the basis of sensing information received from the haptic interaction glove;
a confirmation unit configured to confirm whether or not contact occurs between the virtual hand and a virtual object positioned inside the virtual tactical training environment on the basis of the position, direction, and shape of the virtual hand inside the virtual tactical training environment; and
a designation unit configured to designate a haptic stimulus application region, to which a haptic stimulus is to be applied on the haptic interaction glove, on the basis of a state of contact between the virtual hand and the virtual object when it is confirmed that contact occurs between the virtual hand and the virtual object,
wherein the sensing information comprises at least one selected from an acceleration sensing value sensed from a reference sensor positioned in a palm center region of the haptic interaction glove, a gyroscope sensing value sensed from the reference sensor, and distance sensing values from the reference sensor to respective finger end regions of the haptic interaction glove.

2. The virtual reality simulator of claim 1, wherein the determination unit is configured to determine the position and the direction of the virtual hand on the basis of at least one selected from movement values in three axes in forward/backward, upward/downward, and leftward/rightward directions in a three-dimensional space, which are confirmed from the acceleration sensing value, and three-axes rotation values of pitch, roll, and yaw confirmed from the gyroscope sensing value.

3. The virtual reality simulator of claim 1, wherein the determine unit is configured to determine the shape of the virtual hand on the basis of distances from the reference sensor to respective finger end regions of the haptic interaction glove, which are confirmed from the distance sensing values.

4. The virtual reality simulator of claim 3, wherein the determination unit is confirmed to determine the shape of the virtual hand with reference to a mapping table enumerating mapping relations between combinations of distances from the reference sensor to respective finger end regions of the haptic interaction glove and multiple hand shape images that the tactical trainee can form by moving finger parts.

5. The virtual reality simulator of claim 1, wherein the haptic stimulus application region is designated such that at least one of a center point, to which a haptic stimulus is applied in the haptic stimulus application region, and the area of the haptic stimulus application region, which is calculated with reference to the center point, is different according to the state of contact determined according to the position, direction, and shape of the virtual hand.

6. A method for operating a virtual reality simulator, the method comprising:
determining the position, the direction, and the shape of a virtual hand displayed while being synchronized with a haptic interaction glove worn by a tactical trainee inside a virtual tactical training environment implemented through a virtual display device on the basis of sensing information received from the haptic interaction glove;
confirming whether or not contact occurs between the virtual hand and a virtual object positioned inside the virtual tactical training environment on the basis of the position, direction, and shape of the virtual hand inside the virtual tactical training environment; and
designating a haptic stimulus application region, to which a haptic stimulus is to be applied on the haptic interaction glove, on the basis of a state of contact between the virtual hand and the virtual object when it is confirmed that contact occurs between the virtual hand and the virtual object,
wherein the sensing information comprises at least one selected from an acceleration sensing value sensed from a reference sensor positioned in a palm center region of the haptic interaction glove, a gyroscope sensing value sensed from the reference sensor, and distance sensing values from the reference sensor to respective finger end regions of the haptic interaction glove.

7. The method of claim 6, wherein, in the determining, the position and the direction of the virtual hand are determined on the basis of at least one selected from movement values in three axes in forward/backward, upward/downward, and leftward/rightward directions in a three-dimensional space, which are confirmed from the acceleration sensing value, and three-axes rotation values of pitch, roll, and yaw confirmed from the gyroscope sensing value.

8. The method of claim 6, wherein, in the determining, the shape of the virtual hand is determined on the basis of distances from the reference sensor to respective finger end regions of the haptic interaction glove, which are confirmed from the distance sensing values.

9. The method of claim 8, wherein, in the determining, the shape of the virtual hand is determined with reference to a mapping table enumerating mapping relations between combinations of distances from the reference sensor to respective finger end regions of the haptic interaction glove and multiple hand shape images that the tactical trainee can form by moving finger parts.

10. The method of claim 6, wherein the haptic stimulus application region is designated such that at least one of a center point, to which a haptic stimulus is applied in the haptic stimulus application region, and the area of the haptic stimulus application region, which is calculated with reference to the center point, is different according to the state of contact determined according to the position, direction, and shape of the virtual hand.

* * * * *